US011899772B2

(12) United States Patent
Pham et al.

(10) Patent No.: US 11,899,772 B2
(45) Date of Patent: *Feb. 13, 2024

(54) SYSTEMS AND METHODS FOR DISTORTING CAPTCHA IMAGES WITH GENERATIVE ADVERSARIAL NETWORKS (71) Applicant: Capital One Services, LLC, McLean, VA (US)

(72) Inventors: Vincent Pham, Champaign, IL (US); Anh Truong, Champaign, IL (US); Mark Watson, Sedona, AZ (US); Reza Farivar, Champaign, IL (US); Fardin Abdi Taghi Abad, Champaign, IL (US); Jeremy Goodsitt, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/336,193

(22) Filed: Jun. 1, 2021

(65) Prior Publication Data
US 2021/0294892 A1    Sep. 23, 2021

Related U.S. Application Data (63) Continuation of application No. 16/675,439, filed on Nov. 6, 2019, now Pat. No. 11,074,340.

(51) Int. Cl.
*G06F 21/36* (2013.01)
*G06F 16/51* (2019.01)
(Continued)

(52) U.S. Cl.
CPC .............. *G06F 21/36* (2013.01); *G06F 16/51* (2019.01); *G06F 21/55* (2013.01); *G06N 3/045* (2023.01);
(Continued)

(58) Field of Classification Search
CPC .......... G06F 21/36; G06F 16/51; G06F 21/55; G06F 2221/033; G06F 2221/2133;
(Continued)

(56) References Cited

U.S. PATENT DOCUMENTS 8,019,127 B2 *  9/2011  Misra ...................... G06F 21/36
                                                         382/118
8,739,276 B2 *  5/2014  Hulten .................. G06F 21/577
                                                         726/17
(Continued)

FOREIGN PATENT DOCUMENTS

CN       106096582 A     11/2016
EP        1990770 A1     11/2008
(Continued)

OTHER PUBLICATIONS

CodeGAN, by keon, LantaoYu, wnzhang as author contributors, Source Code Generation with Generative Adversarial Networks (SeqGAN), GitHub website, Jan. 7, 2017, available at https://github.com/keon/CodeGAN/blob/master/README.md (Year: 2017).*

(Continued)

*Primary Examiner* — Jung W Kim
*Assistant Examiner* — Howard H. Louie
(74) *Attorney, Agent, or Firm* — HUNTON ANDREWS KURTH LLP (57) ABSTRACT Systems and methods for distorting CAPTCHA images with generative adversarial networks include an image distortion interface that can select an image record from a database, determine the size of the selected image, and apply an adversarial attack algorithm to create an array of pixels that is the same size as the selected image so that the majority of the pixels in the array are zero values and the remaining pixels in the array are in the red-green-blue value range. The image distortion interface can merge the array of pixels with (Continued)

the selected image to form a distorted image. A server can include a CAPTCHA test interface that can select a set of images having the same label, retrieve corresponding distorted images, and provide a CAPTCHA test using the distorted images. The CAPTCHA test can use distorted images with different applied adversarial attack algorithms.

20 Claims, 9 Drawing Sheets

(51) Int. Cl.
    *G06F 21/55*     (2013.01)
    *G06N 3/08*     (2023.01)
    *G06T 5/50*     (2006.01)
    *G06N 3/045*     (2023.01)

(52) U.S. Cl.
    CPC ............... *G06N 3/08* (2013.01); *G06T 5/50* (2013.01); *G06F 2221/033* (2013.01); *G06F 2221/2133* (2013.01); *G06T 2207/20081* (2013.01); *G06T 2207/20084* (2013.01); *G06T 2207/20221* (2013.01)

(58) Field of Classification Search
CPC . G06N 3/045; G06N 3/08; G06T 5/50; G06T 2207/20081; G06T 2207/20084; G06T 2207/20221
See application file for complete search history.

(56) References Cited

U.S. PATENT DOCUMENTS

| | | | |
|---|---|---|---|
| 8,904,493 | B1 | 12/2014 | Dibble |
| 11,074,340 | B2 | 7/2021 | Pham et al. |
| 2006/0153429 | A1 | 7/2006 | Gehlen et al. |
| 2007/0201745 | A1 | 8/2007 | Wang et al. |
| 2008/0066014 | A1 | 3/2008 | Misra |
| 2009/0097717 | A1 | 4/2009 | Chung et al. |
| 2009/0268050 | A1* | 10/2009 | Tashiro ............ H04N 25/65 348/222.1 |
| 2009/0297064 | A1 | 12/2009 | Koziol et al. |
| 2010/0325706 | A1 | 12/2010 | Hachey |
| 2011/0002511 | A1 | 1/2011 | Imaoka |
| 2011/0078097 | A1 | 3/2011 | Thornton et al. |
| 2011/0113378 | A1* | 5/2011 | Boden ............ G06F 21/36 715/837 |
| 2011/0254942 | A1 | 10/2011 | Suzuki |
| 2012/0272302 | A1 | 10/2012 | Zhu et al. |
| 2013/0044055 | A1 | 2/2013 | Karmarkar et al. |
| 2013/0136343 | A1 | 5/2013 | de Zeeuw et al. |
| 2014/0294254 | A1 | 10/2014 | Kim et al. |
| 2015/0135309 | A1 | 5/2015 | Karmarkar et al. |
| 2017/0011212 | A1* | 1/2017 | Rowlingson ............ G06T 5/002 |
| 2017/0170967 | A1 | 6/2017 | Luo et al. |
| 2017/0323466 | A1 | 11/2017 | Eronen et al. |
| 2018/0060680 | A1 | 3/2018 | Alon |
| 2019/0042837 | A1 | 2/2019 | Mardikar |
| 2019/0080155 | A1 | 3/2019 | Ganong et al. |
| 2019/0156011 | A1 | 5/2019 | Johri et al. |
| 2021/0133317 | A1 | 5/2021 | Pham et al. |
| 2021/0294892 | A1 | 9/2021 | Pham et al. |

FOREIGN PATENT DOCUMENTS

| | | |
|---|---|---|
| EP | 2722792 A2 | 4/2014 |
| EP | 2945098 A1 | 11/2015 |
| EP | 3226166 A2 | 10/2017 |
| EP | 3819830 | 5/2021 |
| WO | 2014178853 A1 | 11/2014 |

OTHER PUBLICATIONS

Stack Overflow, by kitschpatrol, Elmue, Marstep, eboix, as author contributors, OpenCV template matching and transparency, Sep. 29, 2014, available at https://stackoverflow.com/questions/4761940/opencv-template-matching-and-transparency/20461136#20461136 (Year: 2014).*

Kitschpatrol et al., OpenCV Template Matching and Transparency, Stack Overflow, Sep. 29, 2014, available at https://stackoverflow.com/questions/4761940/opencv-template-matching-and-transparency/20461136, pp. 1-8.

Keon et al., Source Code Generation with Generative Adversarial Networks(SeqGan), CodeGAN, GitHub website, Jan. 7, 2017, available at https://github.com/keon/CodeGAN/blob/master/README.md (Year: 2017), pp. 1-5.

Ye et al., "Yet Antoher Text Captcha Solver: A Generative Adversarial Network Based Approach", Computer and Communication Security, ACM, Jan. 15, 2018, pp. 332-348, XP058449099.

European Extended Search Report issued in related European Application No. EP 20206155.2, dated Apr. 9, 2021.

Canadian Office Action Examination Report issued in related Canadian Patent Application No. 3,098,185 dated Oct. 17, 2023.

* cited by examiner

SYSTEMS AND METHODS FOR DISTORTING CAPTCHA IMAGES WITH GENERATIVE ADVERSARIAL NETWORKS

CROSS-REFERENCE TO RELATED APPLICATION

This application is a continuation of U.S. patent application Ser. No. 16/675,439 filed Nov. 6, 2019, the complete disclosure of which is incorporated herein by reference in its entirety.

FIELD OF THE INVENTION

The present disclosure generally relates to Completely Automated Public Turing test to Tell Computers and Humans Apart (CAPTCHA) and generative adversarial networks and, in particular, to systems and methods for distorting CAPTCHA images with generative adversarial networks.

BACKGROUND

Internet robots, sometimes called bots, threaten websites. Malicious bots secretly install malware on vulnerable computers and once infected, computers can become part of a botnet—a network of infected and zombie-like computers controlled by cybercriminals who rent them to carry out illegal plans. Cybercriminals use bots and botnets to launch denial of service attacks, commit fraud, steal data, and crash websites. Cybercriminals use brute-force hacking bot attacks to crack passwords on websites. Malicious bots are dangerous because they are cheap to use and easy to rent, modify, and deploy. Malicious bot attacks are a constantly evolving and persistent threat.

One approach to fighting malicious bot attacks on websites is The Completely Automated Public Turing test to Tell Computers and Humans Apart (CAPTCHA). Users logging on to a website sometimes face CAPTCHA tests. For example, a common CAPTCHA test is an image of several distorted letters where it is the user's job to type the correct series of letters to pass the test and prove they are not a robot. Other common CAPTCHA tests include manually selecting all of the traffic lights, crosswalks, and/or storefronts in an image grid. While CAPTCHA has been widely used in certain circumstances, cybercriminal bot attacks have become more sophisticated and better at passing CAPTCHA. In fact, sometimes bots using artificial intelligence (AI) programs pass CAPTCHA more often than humans do.

Accordingly, there are significant, and competing, needs to create CAPTCHA tests that humans pass easily and bots fail.

SUMMARY

The disclosed subject matter is directed to systems and methods for distorting CAPTCHA images with generative adversarial networks that satisfy these needs.

An example embodiment of the present disclosure can be a system including a database and a server. The database can contain one or more image records. Each image record can include an image field, a distorted image field, a label field and an applied algorithm identifier field. The server can be in data communication with the database. The server can include a memory and an image distortion interface. The memory can contain adversarial attack algorithms. Each adversarial attack algorithm can have an identifier.

The image distortion interface can be stored in the memory. The image distortion interface can select an image record from the database. The image distortion interface can retrieve a selected image stored in the image field of the selected image record. The image distortion interface can determine the size of the selected image. The image distortion interface can apply one of the adversarial attack algorithms to create an array of pixels that is the same size as the selected image. A majority of the pixels in the array can be zero values and the remaining pixels in the array can be in the red-green-blue value range. The image distortion interface can merge the array of pixels with the selected image to form a distorted image. The image distortion interface can update the selected image record in the database. The selected image record can be updated by storing the distorted image in the distorted image field and storing the identifier of the applied adversarial attack algorithm in the applied algorithm identifier field.

The database can store a plurality of image records. The server can include a CAPTCHA test interface that is stored in the memory. The CAPTCHA test interface can select a set of image records from the database. The selection can be made by identifying a label stored in the label field. The CAPTCHA test interface can retrieve a showcase set of distorted images from the distorted image fields of the selected set of image records. The CAPTCHA test interface can provide a CAPTCHA test using the showcase set of distorted images and receive a result from the CAPTCHA test. The CAPTCHA test interface can refine the selected set of image records in the database to those that have different values in the applied algorithm identifier field.

The server can include an algorithm performance interface that is stored in the memory. The algorithm performance interface can turn on or off each of the adversarial attack algorithms based on analytical data collected from the CAPTCHA test. The server can include an analytics database that stores the analytical data from the CAPTCHA test. The CAPTCHA test interface can store the result of the CAPTCHA test in the analytics database. The algorithm performance interface can identify a pattern in the analytics from CAPTCHA tests and swap out one or more of the adversarial attack algorithms based on the pattern. The analytics from CAPTCHA tests can include a metric indicating whether bots are passing the CAPTCHA tests. The analytical data from the CAPTCHA test can include a metric indicating random distribution of noise in the array of pixels.

An example embodiment of the present disclosure can be a method. Image records can be stored. Each image record can include an image field, a distorted image field, a label field and an applied algorithm identifier field. A machine learning model can be trained that includes adversarial attack algorithms. Each adversarial attack algorithm can have a unique identifier. One of the image records can be selected. The method can include retrieving a selected image stored in the image field of the selected image record and determining the size of the selected image. One of the adversarial attack algorithms can be applied to create an array of pixels that is the size of the selected image. A majority of the pixels in the array can be zero values and the remaining pixels in the array can be in the red-green-blue value range. The array of pixels can be merged with the selected image to form a distorted image. The selected image record can be updated by storing the distorted image in the distorted image field and storing the unique identifier of the applied adversarial attack algorithm in the applied algorithm identifier field.

The method can include swapping in or out one or more of the adversarial attack algorithms based on whether bots are passing CAPTCHA tests or based on random distribution of pixel noise or based on a pattern in CAPTCHA tests. The selected set of image records can be refined to those that have different values in the applied algorithm identifier field. A set of image records can be selected that have the same label stored in the label field. A showcase set of distorted images can be retrieved from the distorted image fields of the selected set of image records. A CAPTCHA test can be provided using the showcase set of distorted images. A result can be received from the CAPTCHA test. The machine learning model can be trained using CAPTCHA test data. The CAPTCHA test data can be cleaned. One of the adversarial attack algorithms can be selected to create the array of pixels.

An example embodiment of the present disclosure can be an application. The application can include a database interface that can be configured to retrieve and store image records. Each image record can include an image field, a distorted image field, a label field and an applied algorithm identifier field. The application can include a machine learning model. The machine learning model can include adversarial attack algorithms and an algorithm performance interface. Each adversarial attack algorithm can have a unique identifier. The algorithm performance interface can swap in or out one or more of the adversarial attack algorithms based on whether bots are passing CAPTCHA tests or based on random distribution of pixel noise or based on a pattern in CAPTCHA tests.

The application can include an image distortion interface. The image distortion interface can select one of the image records. The image distortion interface can retrieve a selected image stored in the image field of the selected image record. The image distortion interface can determine the size of the selected image. The image distortion interface can apply one of the adversarial attack algorithms to create an array of pixels that is the same size as the selected image. A majority of the pixels in the array can be zero values and the remaining pixels in the array can be in the red-green-blue value range. The image distortion interface can merge the array of pixels with the selected image to form a distorted image. The image distortion interface can update the selected image record by storing the distorted image in the distorted image field and storing the unique identifier of the applied adversarial attack algorithm in the applied algorithm identifier field.

The application can include a CAPTCHA test interface. The CAPTCHA test interface can select a set of image records that have the same label stored in the label field. The CAPTCHA test interface can refine the selected set of image records to those that have different values in the applied algorithm identifier field. The CAPTCHA test interface can retrieve a showcase set of distorted images from the distorted image fields of the selected set of image records. The CAPTCHA test interface can provide a CAPTCHA test using the showcase set of distorted images and can receive a result from the CAPTCHA test.

These and other features, aspects and advantages of the disclosed subject matter are explained in greater detail with reference to specific example embodiments that are illustrated in the following description, appended claims, and accompanying drawings, in which like elements are indicated with like reference designators.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
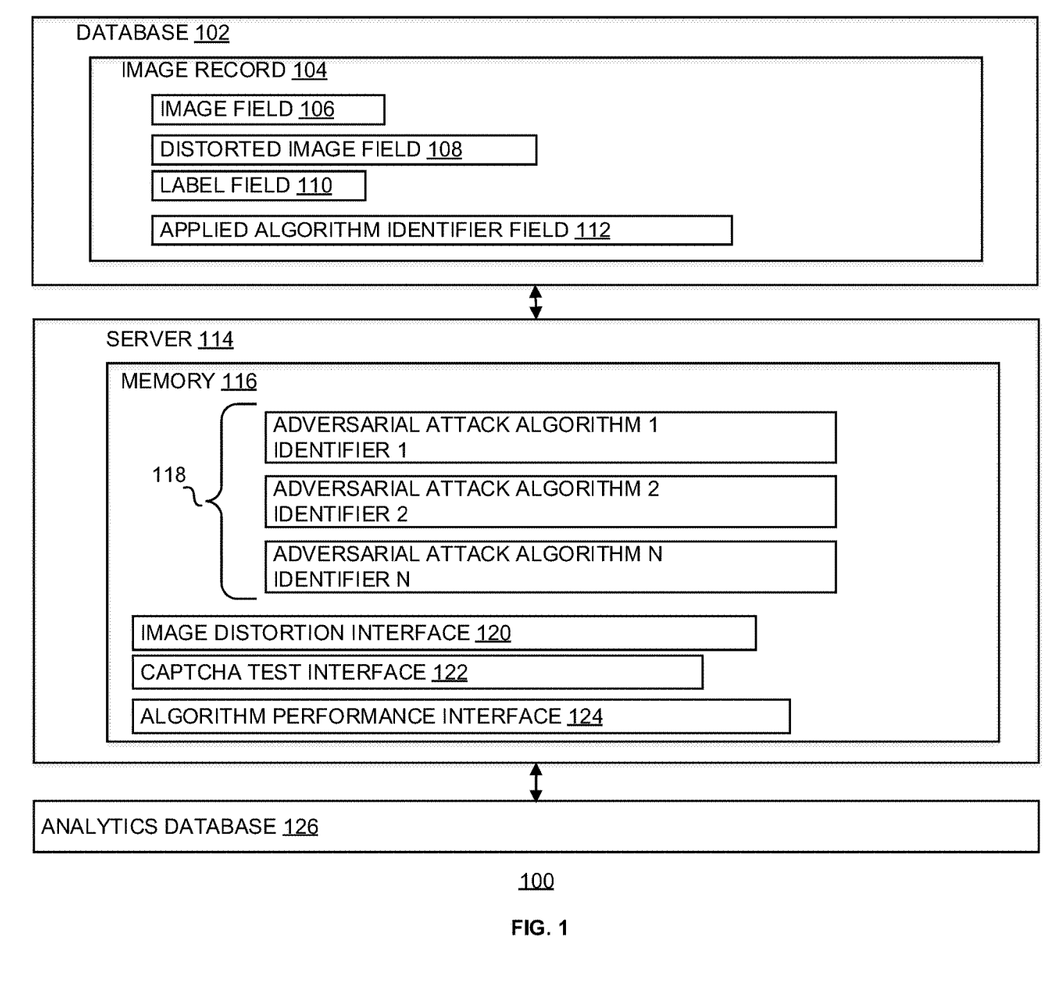
FIG. 1 is a diagram of a system, according to an example embodiment of the disclosure.

FIG. 1 is a diagram of a system 100, according to an example embodiment of the disclosure. System 100 can include a database 102, a server 114, and an analytics database 126, which can be one or more network-enabled computers in data communication with each other. Database 102 and analytics database 126 can be combined into one database system and/or each can contain one or more database systems. Server 114 can include database 102 and/or analytics database 126 or they can be separate.

Database 102 can store image records 104. Each image record 104 can include an image field 106, a distorted image field 108, a label field 110 and an applied algorithm identifier field 112. Database 102 can store various data sets and categories of images for use in CAPTCHA tests such as traffic lights, crosswalks, and storefronts. For an example image record 104, image field 106 can hold an image including a traffic light, distorted image field 108 can hold a distorted version of the image including the traffic light, label field 110 can hold the label "traffic light," and applied algorithm identifier field 112 can hold an identifier identifying which algorithm was used to create the distorted version of the image held in distorted image field 108. Image record 104 can include additional fields such as data set, category, and source.

Server 114 can include a memory 116. Memory 116 can hold adversarial attack algorithms 118, an image distortion interface 120, a CAPTCHA test interface 122, and an algorithm performance interface 124. Each adversarial attack algorithm 118 can have a unique identifier.

Adversarial attack algorithms 118 and algorithm performance interface 124 can be part of an artificial intelligence program capable of executing on server 114 using deep learning techniques and a generative adversarial network (GAN) to generate images for CAPTCHA tests. The program code can be developed using, for example, Tensorflow and Python libraries. Training datasets can include open online image galleries for CAPTCHA such as Kaggle® and proprietary data captured while using CAPTCHA on web apps as well as other sources of data.

GAN can be a technique for generating new samples that look similar to original data. GAN can use two neural networks, one called the discriminator and the other called the generator. The discriminator can try to detect whether a sample is from original data, while the generator can try to generate data that will fool the discriminator into thinking that it came from the original data. In this way, the discriminator and generator can play a game of cat and mouse, where the optimal solution is an equilibrium between the two such as when the discriminator can only detect fake data half the time and the generator can only fool the discriminator half the time. During training, the generator can progressively become better at creating fake images that look real, while the discriminator can becomes better at telling them apart. The process can reach an equilibrium when the discriminator can no longer distinguish real images from fakes.

Algorithm performance interface 124 can include various criteria (e.g., loss and optimizer functions for the generator and discriminator) for selecting the best performing of the adversarial attack algorithms 118 (e.g., humans beating bots on CAPTCHA) as models are trained on data in the GAN program.

Image distortion interface 120 can select image record 104 from database 102. Image distortion interface 120 can retrieve a selected image stored in image field 106 of selected image record 104. Image distortion interface 120 can determine the size of the selected image and apply one of adversarial attack algorithms 118 to create an array of pixels that is the same size as the selected image. A majority of the pixels in the array can be zero values and the remaining pixels in the array can be in the red-green-blue value range. Image distortion interface 120 can merge the array of pixels with the selected image to form a distorted image. Image distortion interface 120 can update selected image record 104 in database 102. Selected image record 104 can be updated by storing the distorted image in distorted image field 108 and storing the identifier of the applied adversarial attack algorithm in applied algorithm identifier field 112.

CAPTCHA test interface 122 can select a set of image records 104 from database 102. The selection can be made from identifying image records 104 having the same label stored in label field 110. CAPTCHA test interface 122 can retrieve a showcase set of distorted images from distorted image fields 108 of the selected set of image records 104. CAPTCHA test interface 122 can provide a CAPTCHA test using the showcase set of distorted images and receive a result from the CAPTCHA test. CAPTCHA test interface 122 can refine the selected set of image records 104 in database 102 to those that have different values in applied algorithm identifier field 112.

Algorithm performance interface 124 can turn on or off each of the adversarial attack algorithms based on analytical data collected from the CAPTCHA test. Server 114 can include analytics database 126 for storing the analytical data from the CAPTCHA test. CAPTCHA test interface 122 can store the result of the CAPTCHA test in analytics database 126. Algorithm performance interface 124 can identify a pattern in the analytics from CAPTCHA tests and swap out one or more of adversarial attack algorithms 118 based on the pattern. The analytics from CAPTCHA tests can include a metric indicating whether bots are passing the CAPTCHA tests. The analytical data from the CAPTCHA test can include a metric indicating random distribution of noise in the array of pixels.

As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

In system 100, a network-enabled computer such as server 114 can include a processor and memory 116, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

In system 100, a network-enabled computer can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system 100 and transmit and/or receive data.

In system 100, a network-enabled computer can be a client device in communication with one or more servers 114 via one or more networks, and can operate as a respective front-end to back-end pair with server 114. A client device can transmit, for example from a mobile device application executing on the client device, one or more requests to server 114. The one or more requests can be associated with retrieving data from server 114. Server 114 can receive the one or more requests from the client device. Based on the one or more requests from the client device, server 114 can be configured to retrieve the requested data from one or more databases 102. Based on receipt of the requested data from one or more databases 102, server 114 can be configured to transmit the received data to the client device. For example, the received data can be responsive to one or more requests.

The network can be one or more of a wireless network, a wired network or any combination of wireless network and wired network, and can be configured to connect the client device to the server. For example, the network can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

The network can include, without limitation, telephone lines, fiber optics, IEEE Ethernet 902.3, a wide area network, a wireless personal area network, a LAN, or a global network such as the Internet. The network can support an Internet network, a wireless communication network, a cellular network, or the like, or any combination thereof. The network can further include one network, or any number of the exemplary types of networks mentioned above, operating as a stand-alone network or in cooperation with each other. The network can utilize one or more protocols of one or more network elements to which they are communicatively coupled. The network can translate to or from other protocols to one or more protocols of network devices. Although the network is depicted as a single network, it should be appreciated that according to one or more examples, the network can comprise any number of interconnected networks, such as, for example, the Internet, a service provider's network, a cable television network, corporate networks, such as credit card association networks, and home networks.

Database 102 and analytics database 125 can be any organized collection of data that is stored and accessed electronically from a network-enabled computer. Database 102 and analytics database 125 can include database management systems (DBMS), which is software that processes data for users such as defining, creating, maintaining, administering, and controlling access to the database. Database 102 and analytics database 125 can be relational databases that models data as rows and columns in tables and uses structured query language (SQL) for writing and querying data. Database 102 and analytics database 125 can be standalone on the network or combined with server 114 or another network-enabled computer. Database 102 and analytics database 125 can include schemas for data sets and features of data sets.

Figure 2:
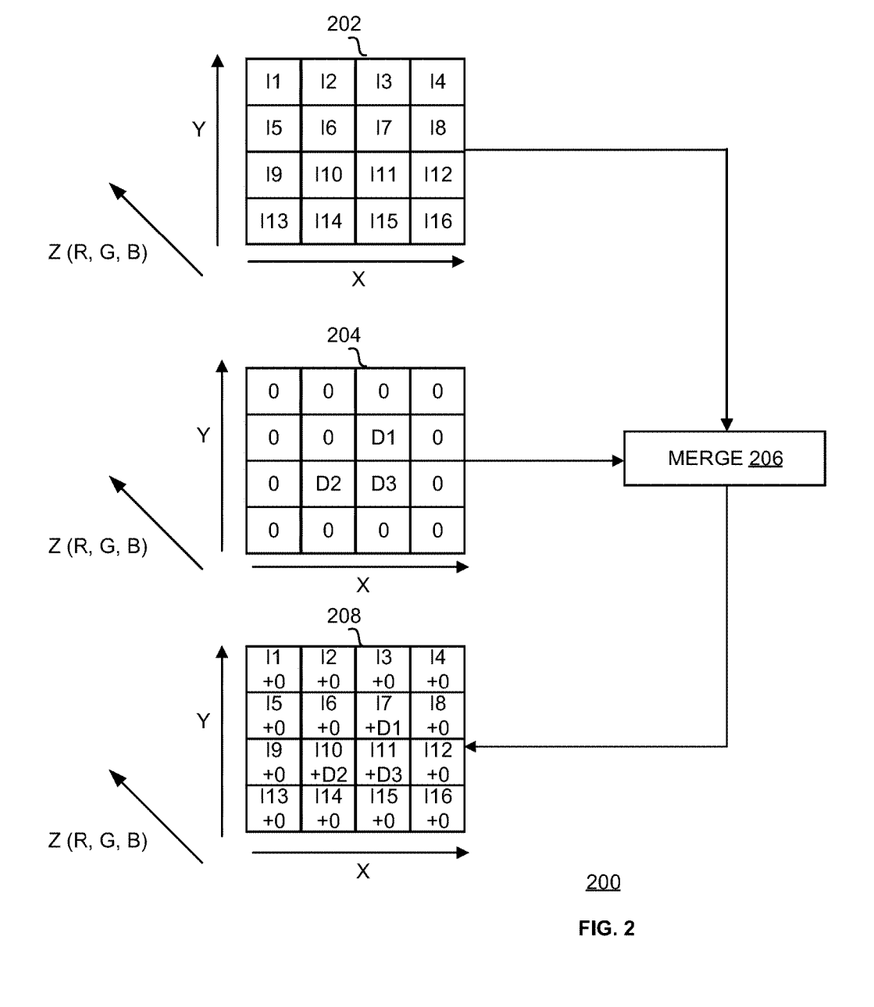
FIG. 2 is a diagram of a method of merging pixel arrays, according to an example embodiment of the disclosure.

FIG. 2 is a diagram of a method 200 of merging pixel arrays, according to an example embodiment of the disclosure. Method 200 can merge a selected image pixel array 202 with a distortion pixel array 204 to form a distorted image pixel array 208.

Each pixel array 202, 204, 208 has the same size or number of pixels. A black and white image can be represented by a two-dimensional pixel array with x columns and y rows, locating each point in space on a two-dimensional display. Each pixel array 202, 204, 208 can be three-dimensional so that there is a depth or z-axis for color in addition to the x and y axes. Each z-element of a pixel array can be a triple of (red, green, blue) having values between 0 and 255 for each of the three colors red, green and blue. For example, pixel D1 in distortion pixel array 204 can have the color defined as the triple (75, 15, 233), which is the color resulting from the combination of values 75 for red, 15 for green, and 233 for blue. A pixel's color value can be determined by its component red, green, and blue intensities on a scale from 0 to 255.

Selected image pixel array 202 can have values (e.g., I1, I2, I3 . . . I16) defining the location and color for each pixel stored in selected image pixel array 202. A merge operation 206 can be used to merge selected image pixel array 202 with distortion pixel array 204 to form distorted image pixel array 208.

Distortion pixel array 204 can be created by applying an adversarial attack algorithm to selected image array 202. A majority of the pixels in distortion pixel array 204 can be zero values and the remaining pixels (i.e., D1, D2, and D3) in distortion pixel array 204 can be non-zero values in the red-green-blue (RGB) range. When merging 206, zero values can have no effect so that most of the pixel value remains the same (e.g., I1+0=I1), while non-zero values modify and distort the image. For example, after merge 206, non-zero pixels D1, D2, and D3 in distortion pixel array 204 can cause resulting distorted pixel array 208 to have a slightly different color for three pixels (i.e., I7+D1, I10+D2, I11+D3) than selected image pixel array 202 (i.e., I7, I10, I11).

Figure 3:
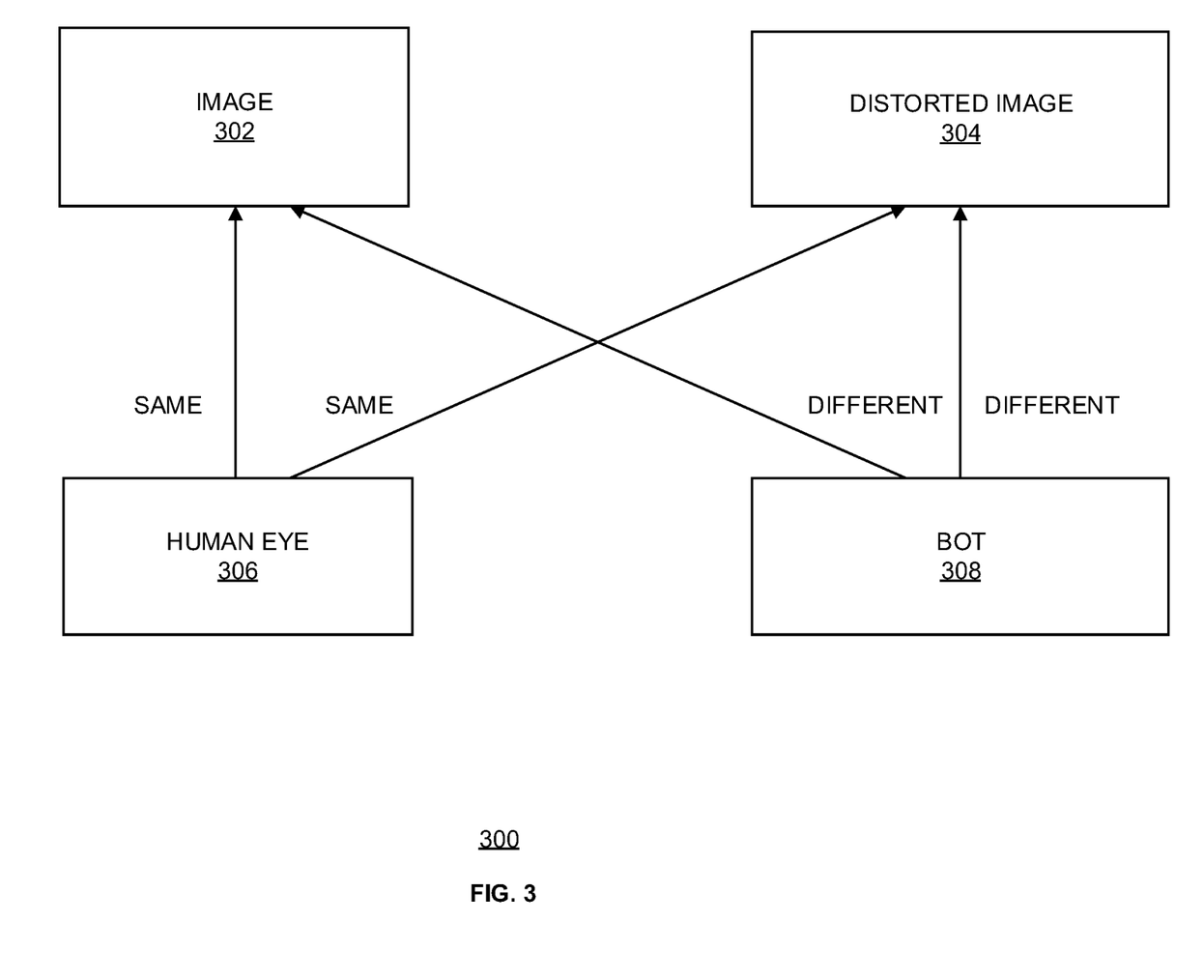
FIG. 3 is an illustration 300 comparing human visual perception to bot image matching, according to an example embodiment of the disclosure.

FIG. 3 is an illustration 300 comparing human visual perception to bot image matching, according to an example embodiment of the disclosure. Computer screens and other displays can use red-green-blue pixel values in pixel arrays to display images. An image 302 can be distorted to form a distorted image 304 by injecting a small amount of random pixel noise into image 302. For example, to a human eye 306, both image 302 and distorted image 304 can look like a dog, but to a bot 308, distorted image 304 can look like a monkey or a box or something else completely different from a dog.

Human eye 305 can perceive image 302 as being the same as distorted image 304 because the pixel values in the red-green-blue range do not perceptibly change the features of the image. Human eye 305 can typically perceive all of the colors in the visible spectrum of light based on the RGB color model of how the human brain interprets colors. In addition, human eye 305 can perceive features of an image and classify the image based on the features.

Bot 308 can determine that image 302 is different than distorted image 304. Bot 308 can compare image 302 to distorted image 304 by, for example, detecting key features such as edges, vertical lines, horizontal line, etc. in the pixel arrays. Bot 308 can use a machine learning model that tends to learn early on about the edges of a kind of image, the curves within that kind of image, the color of that kind of image. By contrast, human eye 305 does not tend to notice those things but rather notice overall features that distinguish a kind of image.

Bot 308 can, for example, use convolutional neural networks (CNN) to classify images pretty well. However, distorted image 304 can be distorted in such a way that prevents recognition by bot 308, while human eye 306 can recognize they are the same. Distorted image 304 can be made to fool bot 308 while not fooling human eye 305 by using a GAN program to select the best adversarial attack algorithm to create distorted image 304.

Figure 4:
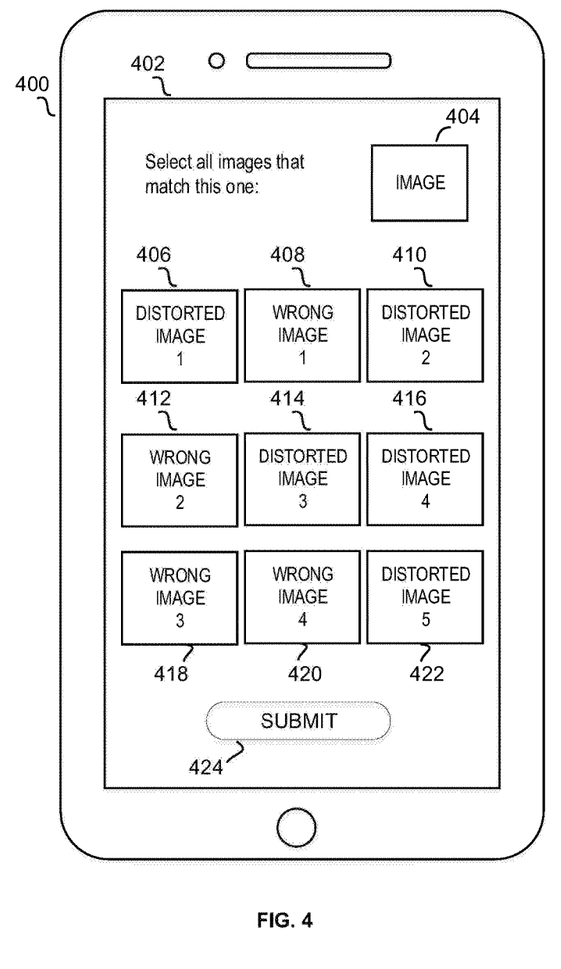
FIG. 4 is a diagram of a mobile phone having a CAPTCHA test display, according to an example embodiment of the disclosure.

FIG. 4 is a diagram of a mobile phone 400 having a CAPTCHA test display 402, according to an example embodiment of the disclosure. CAPTCHA test display 402 includes a request for the user to select all the images that match an image 404 from a selection of nine images: distorted image 1 406, wrong image 1 408, distorted image 2 410, wrong image 2 412, distorted image 3 414, distorted image 4 416, wrong image 3 418, wrong image 4 420, and distorted image 5 422, and a submit button 424. To pass the test, the user can select distorted images 1 to 5 406, 410, 414, 416, 422 and press submit button 424. A bot would not recognize distorted images 1 to 5 406, 410, 414, 416, 422 as matching image 404, while a human eye would perceive them as being the same.

Figure 5:
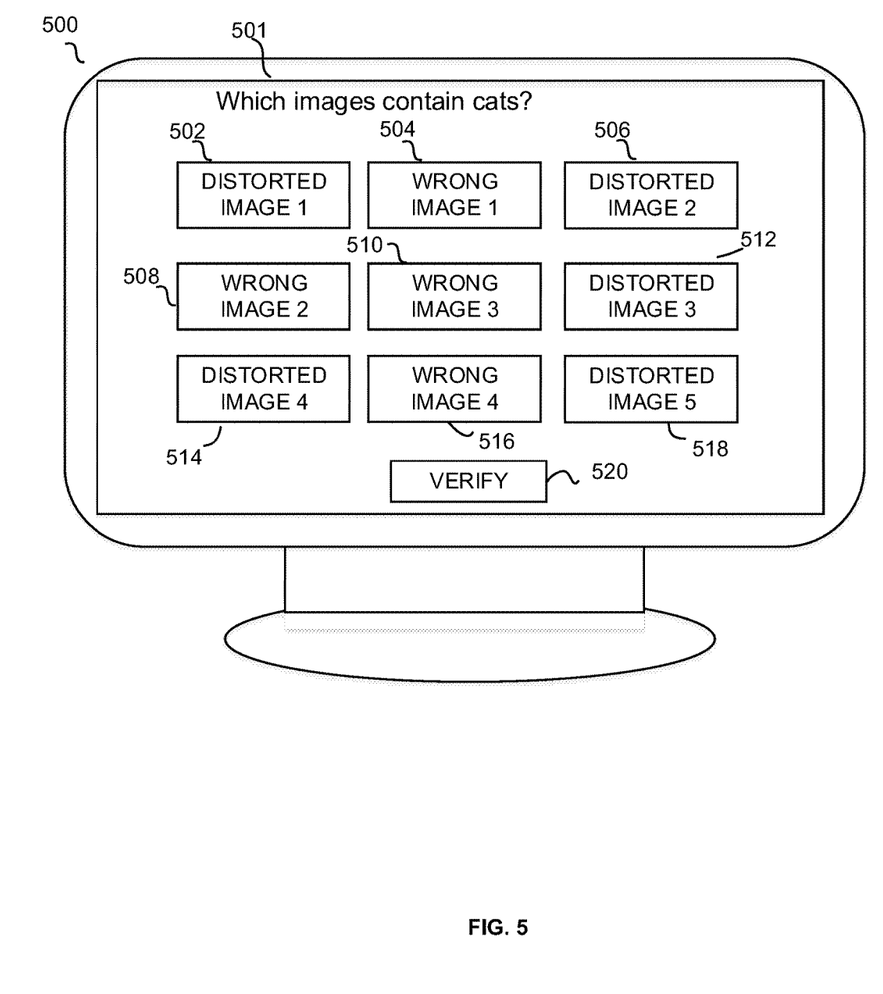
FIG. 5 is a diagram of a computer having a CAPTCHA test display, according to an example embodiment of the disclosure.

FIG. 5 is a diagram of a computer 500 having a CAPTCHA test display 501, according to an example embodiment of the disclosure. CAPTCHA test display 501 includes a request for the user to determine which images contain cats from a selection of nine images: distorted image 1 502, wrong image 1 504, distorted image 2 506, wrong image 2 508, wrong image 3 510, distorted image 3 512, distorted image 4 514, wrong image 4 516, and distorted image 5 518, and a verify button 520. To pass the test, the user can select distorted images 1 to 5 502, 506, 512, 514, 518. A bot would not recognize distorted images 1 to 5 502, 506, 512, 514, 518 as containing cats, while a human eye would.

A bot using convolutional neural networks (CNN) to classify images can easily be fooled with a little bit of carefully constructed pixel noise injected into an image to form a distorted image. On the other hand, a human eye would not be fooled by a small amount of injected pixel noise in an image and would probably not even detect that the image was distorted. A humanly imperceptible little bit of pixel noise can trip up bots using CNN and confuse them into misclassifying an image.

Figure 6:
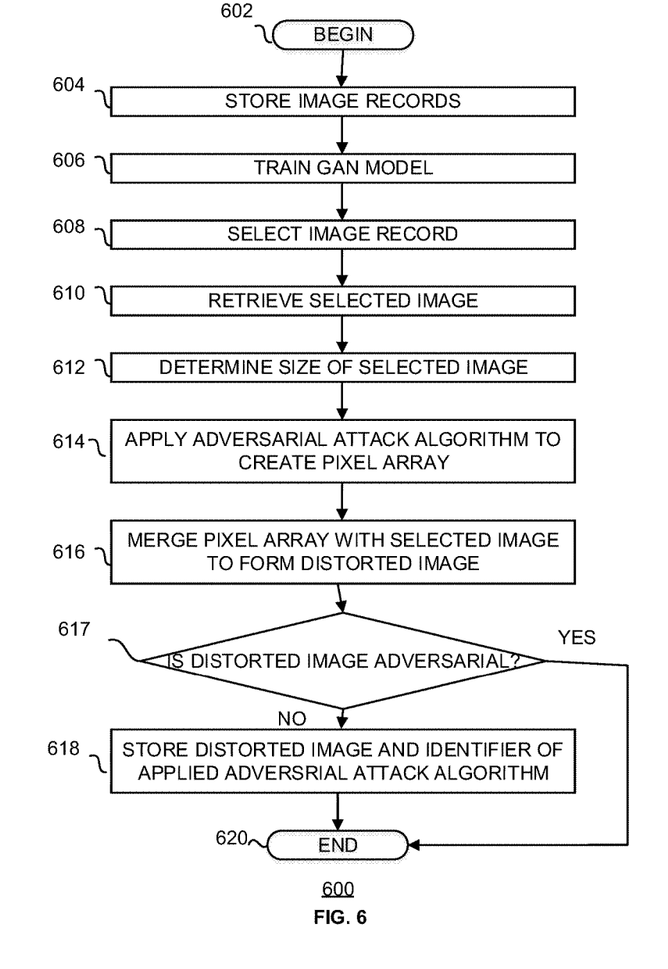
FIG. 6 is a flow chart of a method, according to an example embodiment of the disclosure.

FIG. 6 is a flow chart of a method 600, according to an example embodiment of the disclosure. Method 600 beings at block 602. At block 604, image records can be stored. Each image record can include an image field, a distorted image field, a label field and an applied algorithm identifier field.

At block 606, a GAN model can be trained using an originating dataset that includes images suitable for CAPTCHA tests such as trains, cars, dogs, cats, etc. For example, the GAN model can include two neural networks, the discriminator and the generator. The discriminator can try to detect whether a sample image is from the originating dataset. For example, the discriminator can use CNN or pattern matching. The generator can attempt to generate data that will fool the discriminator into thinking it came from the originating dataset. The generator also can generate an adversarial attack algorithm that creates a pixel array that when merged with the sample image, distorts it in a way that is imperceptible to humans but fools the discriminator. Thus, the discriminator and the generator can play a game of cat and mouse where the optimal solution is an equilibrium between the two. For example, the equilibrium can be when the discriminator can only detect fake data 50% of the time and the generator can only fool the discriminator 50% of the time. After training, a number of adversarial attack algorithms generated by the generator can be rated and stored with identifiers. Rating can include how successfully humans versus bots classify distorted images created by applying the adversarial attack algorithm, for example. Rating information can be available in an analytics database and/or the database used to train the GAN model.

At block 608, one of the image records can be selected. For example, an image that is labeled as containing a cat can be selected for a CAPTCHA test that asks the user which images contain cats. The image record can be selected from the results of querying a database storing image records for images labeled as cats.

At block 610, selected image is retrieved. The selected image record can be copied from the database to a temporary storage on a server for processing.

At block 612, the size of the selected image is determined. An image distortion program running on the server can determine how many pixels are in the pixel array of the selected image and their locations and colors for display on a user device.

At block 614, one of the adversarial attack algorithms can be applied to create an array of pixels that is the same size as the selected image, where a majority of the pixels in the array are zero values and the remaining pixels in the array are in the red-green-blue value range. The adversarial attack algorithm can distribute the non-zero pixels randomly and the RGB values can be low, at the level of noise. The applied adversarial attack algorithm can be the best performing of the adversarial attack algorithms generated during training of the GAN model. The image distortion program running can decide which adversarial attack algorithm is the best performing by, for example, choosing the one with the best success rate for fooling bots but not humans in CAPTCHA tests. The image distortion program can create a distortion array of pixels using the chosen adversarial attack algorithm.

At block 616, the array of pixels can be merged with the selected image to form a distorted image. The image distortion program can merge the distortion array of pixels with the selected image to form the distorted image.

At block 617, it is determined whether the distorted image was flagged as adversarial. An ensemble of various adversarial defense networks or neural networks trained to detect adversarial attacks can be used to determine whether the distorted image is adversarial. If any of the various adversarial defense networks flags the distorted image as adversarial, then method 600 ends at block 620, because the distorted image is not strong enough. If the distorted image is not flagged as adversarial, then method 600 continues at block 618.

At block 618, the selected image record can be updated by storing the distorted image in the distorted image field and storing the unique identifier of the applied adversarial attack algorithm in the applied algorithm identifier field. The image distortion program on the server can update this information in the database using interfaces available via a database management system. This information can be used to create CAPTCHA tests with distorted images. At block 620, method 600 ends.

Figure 7:
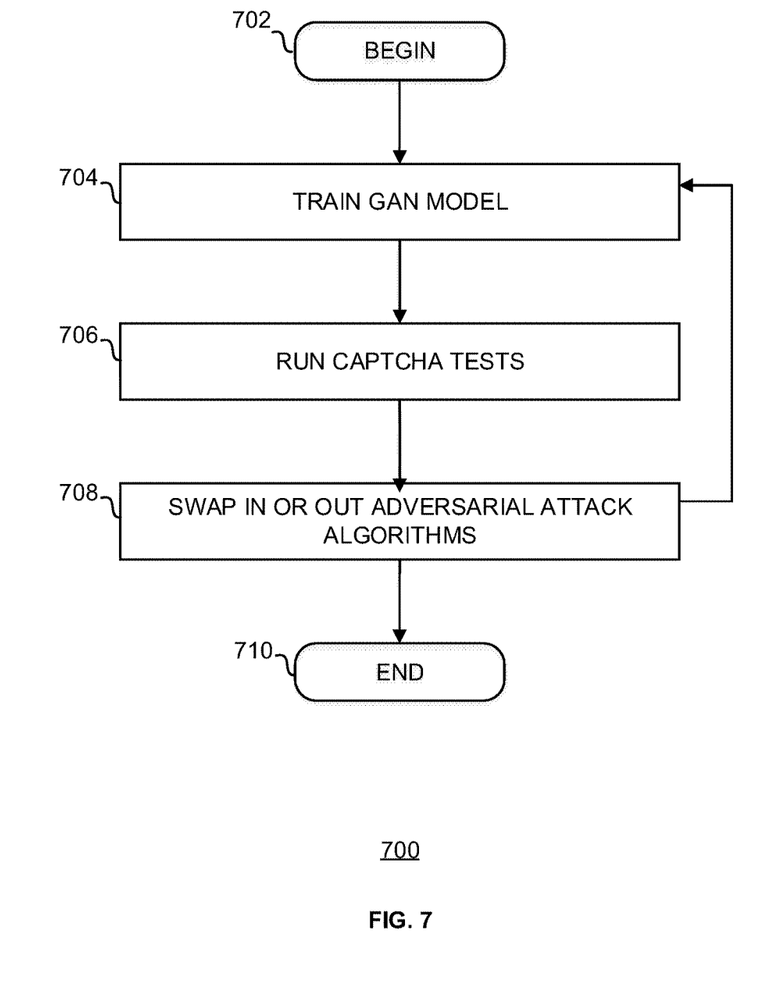
FIG. 7 is a flow chart of a method, according to an example embodiment of the disclosure.

FIG. 7 is a flow chart of a method 700, according to an example embodiment of the disclosure. Method 700 begins at block 702.

At block 704, a GAN model can be trained. Images commonly used for CAPTCHA tests can be collected in a database for training. Data can be collected about recent bot attacks or CAPTCHA test failures where bots pass but humans do not. Generator and discriminator models can be trained on the images commonly used for CAPTCHA tests with goals of creating adversarial attack algorithms that distort images in such a way that bot attacks are avoided and humans pass the CAPTCHA tests and bots do not.

At block 706, CAPTCHA tests can be run. Data about the performance of distorted images in CAPTCHA tests can be analyzed and stored in a database. The distorted images can be made by applying various adversarial attack algorithms to images in the training data. The distorted images can be made by an image distortion interface in the GAN program. The GAN program can analyze and store the competitive performance of the generated adversarial attack algorithms in distorting images for CAPTCHA tests that humans pass but bots do not pass.

At block 708, one or more of the adversarial attack algorithms can be swapped in or out. Swapping can be done based on whether bots versus humans are passing CAPTCHA tests. Swapping can be done based on the random distribution of pixel noise in the distorted images generated by the adversarial attack algorithm. Swapping can be done based on a pattern found while training the models. For example, the GAN program can collect metrics such as how many CAPTCHA tests are passed on a particular website compared to the historical trend. If the passing rates changes over time or there is a pattern, the adversarial attack algorithms can be swapped in or out. For example, adversarial attack algorithms can be swapped out at a threshold of degrading performance.

Using the performance data stored in the database, the GAN program can process the output from training the GAN model and running CAPTCHA tests and improve its performance in furtherance of the goals of avoiding bot attacks and making CAPTCHA tests that humans pass but bots to not. The GAN model can be improved by using more successful adversarial attack algorithms more often and using the less successful one less often in the next round of training. The GAN model can be improved by only using the most successful adversarial attack algorithms in the next round of training. The GAN model can be improved by not using the least successful adversarial attack algorithms in the next round of training. For example, an adversarial attack algorithm that distorts an image so much that the distorted image looks different to humans can be turned off. After swapping adversarial attack algorithms in and out method 700 can loop back for more GAN model training at block 704, eventually ending at block 710 when cost and quality constraints are met.

Figure 8:
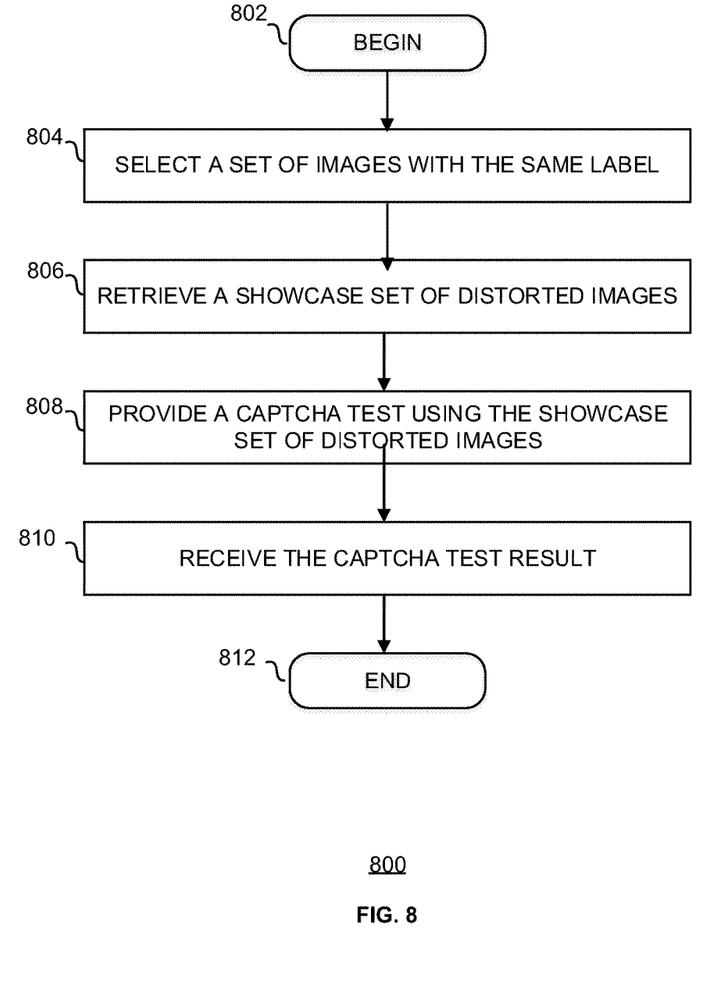
FIG. 8 is a flow chart of a method, according to an example embodiment of the disclosure.

FIG. 8 is a flow chart of a method 800, according to an example embodiment of the disclosure. Method 800 creates, presents, and runs a CAPTCHA test using distorted images. Method 800 begins at block 802.

At block 804, a CAPTCHA test program running on a server can use a database management system to select a set of image records that have the same label stored in the label field. For example, the set of images can all be labeled as store fronts. The selected set of image records can be refined to those that have different values in the applied algorithm identifier field. By using different applied algorithms, the images can be distorted in varying ways, making it harder for a bot to pass the CAPTCHA test.

At block 806, the CAPTCHA test program can retrieve a showcase set of distorted images from the distorted image fields of the selected set of image records. For example, a set of five distorted images can be retrieved, each distorted by applying a different algorithm.

At block 808, a CAPTCHA test can be provided by the program using the showcase set of distorted images. The CAPTCHA test can be displayed on a user device where the user is asked to identify all the images showing a store front. For example, five correct distorted images showing a store front can be displayed along with four wrong images for a total of nine images.

At block 810, a result can be received from the CAPTCHA test. The user selections can be compared to the correct images and the program can determine whether or not the user passed the test. Test results can be analyzed and stored for training the GAN model. Method 800 ends at block 812.

Figure 9:
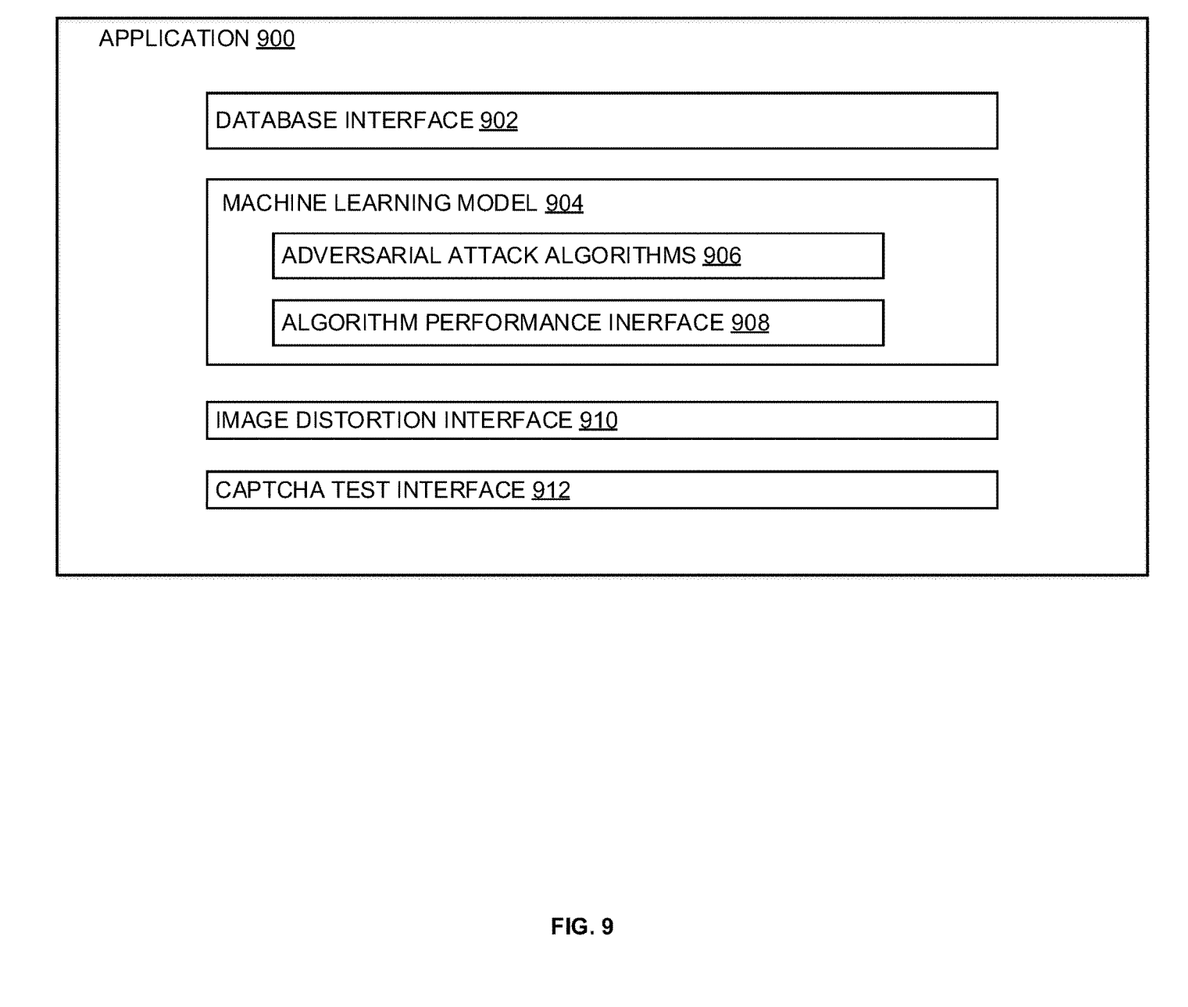
FIG. 9 is a diagram of an application, according to an example embodiment of the disclosure.

FIG. 9 is a diagram of an application 900, according to an example embodiment of the disclosure. Application 900 can include a database interface 902, a machine learning model 904, an image distortion interface 910, and a CAPTCHA test interface 912. Machine learning model 904 can include adversarial attack algorithms 906 and an algorithm performance interface 908. Application 900 can be capable of execution by a processor on a network-enabled computer such as a server. Application 900 can have access to a database, a machine learning model training environment, and a user device.

Database interface 902 can be configured to retrieve and store image records using application programming interfaces and other programs such as queries to interact with a database management system. Application 900 can define the structure of the image records in a schema so that each image record includes an image field, a distorted image field, a label field and an applied algorithm identifier field.

Machine learning model 904 can be a deep learning model, a neural network model, an adversarial attack and defense model, or other machine learning model applied to image classification. Machine learning model 904 can be a GAN model that generates samples similar to the training set.

Application 900 can be a GAN procedure that includes a discriminative deep learning network (discriminator) and a generative deep learning network (generator). The discriminative network can distinguish between samples taken from an original database and those generated by the GAN procedure. The generative network can produce samples and can be trained to maximize the probability of the discriminator making a mistake. The competition between the discriminator and the generator can lead both models to improve their accuracy. The GAN procedure can end when the discriminator fails to distinguish between the samples from the training set and those generated by the generator. The generator and discriminator can be in a game where the generator tries to fool the discriminator while the discriminator tries to prevent being fooled. The objective of the GAN procedure can be to maximize the probability of assigning the correct label to training and sample examples while simultaneously training the generator to minimize it.

The generator can generate adversarial attack algorithms 906 in an attempt to fool the discriminator. Adversarial attack algorithms 906 can make an adversarial attack by injecting random pixel noise into an image. Algorithm performance interface 908 can swap in or out one or more of adversarial attack algorithms 906 based on whether bots are passing CAPTCHA tests or based on random distribution of pixel noise or based on a pattern in CAPTCHA tests.

Image distortion interface 910 can select one of the image records. Image distortion interface 910 can retrieve a selected image stored in the image field of the selected image record. Image distortion interface 910 can determine the size of the selected image. Image distortion interface 910 can apply one of the adversarial attack algorithms to create an array of pixels that is the same size as the selected image. A majority of the pixels in the array can be zero values and the remaining pixels in the array can be in the red-green-blue value range. Image distortion interface 910 can merge the array of pixels with the selected image to form a distorted image. Image distortion interface 910 can update the selected image record by storing the distorted image in the distorted image field and storing the unique identifier of the applied adversarial attack algorithm in the applied algorithm identifier field.

CAPTCHA test interface 912 can select a set of image records that have the same label stored in the label field. CAPTCHA test interface 912 can refine the selected set of image records to those that have different values in the applied algorithm identifier field. CAPTCHA test interface 912 can retrieve a showcase set of distorted images from the distorted image fields of the selected set of image records. CAPTCHA test interface 912 can provide a CAPTCHA test using the showcase set of distorted images and can receive a result from the CAPTCHA test.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    a database containing a plurality of image records, each image record comprising an image field, a distorted image field, a label field and an applied algorithm identifier field; and
    a server in data communication with the database, wherein the server comprises:
        a memory containing a plurality of adversarial attack algorithms, each adversarial attack algorithm having an identifier;
        an image distortion interface stored in the memory and configured to:
            select an image record from the database;
            retrieve a selected image stored in the image field of the selected image record;
            determine a size of the selected image;
            apply one of the adversarial attack algorithms to create an array of pixels that is the size of the selected image;
            merge the array of pixels with the selected image to form a distorted image; and
            update the selected image record in the database by storing the distorted image in the distorted image field of the selected image record and storing the identifier of the applied adversarial attack algorithm in the applied algorithm identifier field of the selected image record; and
        a CAPTCHA test interface stored in the memory and configured to:
            select only a set of image records that have a same label stored in the label field;
            retrieve a showcase set of distorted images from a plurality of distorted image fields of the selected set of image records;
            provide a CAPTCHA test using the showcase set of distorted images, by displaying only the set of distorted images with the same label; and
            receive a result from the CAPTCHA test.

2. The system of claim 1, wherein the CAPTCHA test interface is further configured to refine the selected set of image records in the database to those that have different values in the applied algorithm identifier field.

3. The system of claim 1, wherein the server further comprises:
    an algorithm performance interface that is stored in the memory and configured to turn on or off each of the adversarial attack algorithms based on analytical data collected from the CAPTCHA test.

4. The system of claim 3, further comprising:
    an analytics database that stores the analytical data from the CAPTCHA test,
    wherein the CAPTCHA test interface is further configured to store the result of the CAPTCHA test in the analytics database.

5. The system of claim 3, wherein the algorithm performance interface is further configured to:
    identify a pattern in analytical data collected from CAPTCHA tests; and
    swap out one or more of the adversarial attack algorithms based on the pattern.

6. The system of claim 3, wherein analytical data collected from CAPTCHA tests include a metric indicating whether bots are passing the CAPTCHA tests.

7. The system of claim 3, wherein the analytical data from the CAPTCHA test includes a metric indicating random distribution of noise in the array of pixels.

8. The system of claim 1, wherein the array of pixels are created by the one of the adversarial attack algorithms in such a way that the remaining pixels in the array do not perceptibly change features of the selected image for a human eye, such that the human eye perceives the distorted image as the selected image while a bot determines the distorted image as being different than the selected image.

9. A method, comprising:
    storing image records, each image record comprising an image field, a distorted image field, a label field and an applied algorithm identifier field;
    training a machine learning model that comprises a plurality of adversarial attack algorithms, each adversarial attack algorithm having a unique identifier;

selecting one of the image records;
retrieving a selected image stored in the image field of the selected image record;
determining a size of the selected image;
applying one of the adversarial attack algorithms to create an array of pixels that is the size of the selected image, wherein a majority of the pixels in the array are zero values and the remaining pixels in the array are noise-level red-green-blue values;
merging the array of pixels with the selected image to form a distorted image;
updating the selected image record by storing the distorted image in the distorted image field of the selected image record and storing the unique identifier of the applied adversarial attack algorithm in the applied algorithm identifier field of the selected image record;
selecting only a set of image records that have a same label stored in the label field;
retrieving a showcase set of distorted images from a plurality of distorted image fields of the selected set of image records; and
providing a CAPTCHA test using the showcase set of distorted images, by displaying only the set of distorted images with the same label.

10. The method of claim 9, further comprising:
swapping in or out one or more of the adversarial attack algorithms based on whether bots are passing CAPTCHA tests.

11. The method of claim 9, further comprising:
swapping in or out one or more of the adversarial attack algorithms based on random distribution of pixel noise.

12. The method of claim 9, further comprising:
swapping in or out one or more of the adversarial attack algorithms based on a pattern in CAPTCHA tests.

13. The method of claim 9, further comprising:
refining the selected set of image records to those that have different values in the applied algorithm identifier field.

14. The method of claim 9, wherein the machine learning model is trained using CAPTCHA test data.

15. The method of claim 9, wherein the array of pixels are created by the one of the adversarial attack algorithms in such a way that the remaining pixels in the array do not perceptibly change features of the selected image for a human eye, such that the human eye perceives the distorted image as the selected image while a bot determines the distorted image as being different than the selected image.

16. The method of claim 9, further comprising:
selecting one of the adversarial attack algorithms to create the array of pixels.

17. The method of claim 9, wherein the adversarial attack algorithms are generated by a generative adversarial network.

18. A non-transitory computer-accessible medium having stored thereon computer-executable instructions, wherein upon execution by a processor, the instructions cause the processor to perform a method comprising:
storing image records, each image record comprising an image field, a distorted image field, a label field and an applied algorithm identifier field;
training a generative adversarial network that generates a plurality of adversarial attack algorithms, each adversarial attack algorithm having a unique identifier;
selecting one of the image records;
retrieving a selected image stored in the image field of the selected image record;
determining a size of the selected image;
applying one of the adversarial attack algorithms to create an array of pixels that is the size of the selected image;
merging the array of pixels with the selected image to form a distorted image;
updating the selected image record by storing the distorted image in the distorted image field of the selected image record and storing the unique identifier of the applied adversarial attack algorithm in the applied algorithm identifier field of the selected image record;
refining a selected set of image records to those that have different values in the applied algorithm identifier field;
selecting only a set of image records that have a same label stored in the label field;
retrieving a showcase set of distorted images from a plurality of distorted image fields of the selected set of image records; and
providing a CAPTCHA test using the showcase set of distorted images, by displaying only the set of distorted images with the same label.

19. The non-transitory computer-accessible medium of claim 18, wherein a majority of the pixels in the array are zero values and the remaining pixels in the array are noise-level red-green-blue values.

20. The non-transitory computer-accessible medium of claim 18, the method further comprising swapping one or more of the adversarial attack algorithms in or out of the generative adversarial network.

* * * * *